US012661678B2

(12) United States Patent
Tobler

(10) Patent No.: US 12,661,678 B2

(45) Date of Patent: Jun. 23, 2026

(54) REAR CASING FOR A SPRAY GUN AND SPRAY GUN COMPRISING A REAR CASING OF THIS TYPE

(71) Applicant: GEMA SWITZERLAND GMBH, St. Gallen (CH)

(72) Inventor: Roger Tobler, Herisau (CH)

(73) Assignee: GEMA SWITZERLAND GMBH, Gossau (CH)

( * ) Notice: Subject to any disclaimer, the term of this patent is extended or adjusted under 35 U.S.C. 154(b) by 708 days.

(21) Appl. No.: 17/423,077

(22) PCT Filed: Feb. 27, 2020

(86) PCT No.: PCT/EP2020/055086

§ 371 (c)(1),
(2) Date: Jul. 14, 2021

(87) PCT Pub. No.: WO2020/178114

PCT Pub. Date: Sep. 10, 2020

(65) Prior Publication Data

US 2022/0080447 A1 Mar. 17, 2022

(30) Foreign Application Priority Data

Mar. 1, 2019 (DE) ......................... 102019105244.0

(51) Int. Cl.
*B05B 15/63* (2018.01)
*B05B 5/03* (2006.01)
*B05B 15/62* (2018.01)

(52) U.S. Cl.
CPC .............. *B05B 15/63* (2018.02); *B05B 5/032* (2013.01); *B05B 15/62* (2018.02)

(58) Field of Classification Search
CPC ......... B05B 15/62; B05B 15/63; B05B 5/032; B05B 12/002; B05B 7/1209
(Continued)

(56) References Cited

U.S. PATENT DOCUMENTS 3,758,039 A 9/1973 Wagner
3,840,184 A * 10/1974 Spivey .................. B05B 7/1209 239/528

(Continued)

FOREIGN PATENT DOCUMENTS

DE 19538252 A1 4/1996
EP 1236545 A2 4/2002

(Continued)

OTHER PUBLICATIONS

Notification of Transmittal of Translation of the International Preliminary Report on Patentability, dated Sep. 2, 2021, received for corresponding PCT Application No. PCT/EP2020055086, five pages.

(Continued)

*Primary Examiner* — Kevin Edward Schwartz
(74) *Attorney, Agent, or Firm* — Kinney & Lange, P.A.

(57) ABSTRACT

A rear casing is disclosed for a spray gun that has a handle part and a gun barrel connected to the handle part. The rear casing can be removably and exhangeably attached to the rear side of a main body of the spray gun and has a first region designed as a handle casing and a second region designed as a covering casing for rear-side covering of a rear region of the gun barrel. At least one connection element is provided on the second region of the rear casing for optionally forming a removable connection to a part having, for this purpose, at least some portions with a design complementing that of said connection element. In particular, according to the invention, the entire rear casing, together with the at least one connection element, is designed as a monolithic plastic component, in particular a plastic injection moulded molded part.

14 Claims, 4 Drawing Sheets

(58) Field of Classification Search
USPC .......................... 239/526, 690, 525; 118/629
See application file for complete search history.

(56) References Cited

U.S. PATENT DOCUMENTS

| | | | | | |
|---|---|---|---|---|---|
| 4,214,709 | A * | 7/1980 | Scull | B05B 5/03 | 239/707 |
| 4,437,614 | A * | 3/1984 | Garcowski | B05B 5/10 | 239/704 |
| 4,651,929 | A * | 3/1987 | Kranzle | B05B 9/01 | 239/526 |
| 5,022,590 | A * | 6/1991 | Buschor | B05B 5/0531 | 239/708 |
| 5,640,741 | A * | 6/1997 | Yano | B25F 5/02 | 16/DIG. 12 |
| 6,536,688 | B1 | 3/2003 | Chun-Lee | | |
| 6,622,948 | B1 * | 9/2003 | Haas | B05B 5/032 | 239/708 |
| 7,617,998 | B2 * | 11/2009 | Mauchle | B05B 5/0531 | 239/707 |
| 7,748,153 | B2 * | 7/2010 | Beretta | F41C 23/10 | 42/71.02 |
| 8,814,066 | B2 * | 8/2014 | Hung | B05B 1/18 | 239/525 |
| 10,293,351 | B2 | 5/2019 | Krayer | | |
| 2006/0202060 | A1 * | 9/2006 | Alexander | B05B 7/0815 | 239/296 |
| 2008/0191067 | A1 * | 8/2008 | Mauchle | B05B 5/032 | 239/690 |
| 2013/0075497 | A1 | 3/2013 | Hung | | |
| 2013/0240646 | A1 * | 9/2013 | Dietrich | B05B 5/032 | 239/690 |
| 2015/0231652 | A1 * | 8/2015 | Ulrich | B05B 5/0532 | 239/708 |
| 2016/0303596 | A1 * | 10/2016 | Tullney | B05B 15/63 | |
| 2017/0304853 | A1 * | 10/2017 | Krayer | B05B 15/62 | |

FOREIGN PATENT DOCUMENTS

| | | | |
|---|---|---|---|
| EP | 1657519 | A1 | 5/2006 |
| GB | 2067923 | A | 8/1981 |

OTHER PUBLICATIONS

First German Office Action dated Dec. 8, 2019, for corresponding German Application No. 10 2019 105 244.0.

Second German Office Action dated Mar. 3, 2021, for corresponding German Application No. 10 2019 105 244.0.

International Search Report dated May 25, 2020, for corresponding PCT Application No. PCT/EP2020/055086.

* cited by examiner

REAR CASING FOR A SPRAY GUN AND SPRAY GUN COMPRISING A REAR CASING OF THIS TYPE

CROSS-REFERENCE TO RELATED APPLICATION(S)

This application is the national phase of PCT Application No. PCT/EP2020/055086, filed Feb. 27, 2020, entitled "REAR CASING FOR A SPRAY GUN AND SPRAY GUN COMPRISING A REAR CASING OF THIS TYPE", which in turn claims priority to German Patent Application No. 10 2019 105 244.0, filed on Mar. 1, 2019, both of which are incorporated herein by reference in their entireties.

BACKGROUND

The present disclosure relates in general to the technical field of spray coating objects.

According to one aspect of the disclosure, it in particular relates to a spray gun for spray coating objects with powdered coating material. Yet the disclosure is not limited thereto but can also be used with spray guns for spray coating objects with liquid coating material.

The disclosure in particular relates to an optimized rear casing for spray guns able to cover the rear side of a spray gun base body.

Spray guns of the type considered herein are already known from the prior art. For example, the EP 0 383 030 A1 printed publication relates to a spray gun for spray coating objects with coating powder. The spray gun known from this prior art comprises a handle part and a gun barrel connected to said handle part.

Particularly when powder spray guns are used, fine powder dust is generated which can undesirably infiltrate into the gun. In the case of spray guns for liquid coating material, there is the risk of atomized liquid particles accumulating inside the spray gun. Both with powder spray guns as well as with liquid spray guns, there is the fundamental danger of the development of high-voltage creepage paths between the high-voltage parts for electrostatically charging the coating material and the parts of the gun to be electrically insulated therefrom at the interfaces between said gun parts.

A further disadvantage of the spray guns generally known from the prior art can be seen in the handle parts of the spray guns often not being of optimal ergonomic design. Moreover, the spray guns known from the prior art have the disadvantage of often not exhibiting the necessary rigidity in terms of bending and torsion.

The disclosure is therefore based on the task of remedying the addressed problems.

SUMMARY

According to one aspect of the disclosure, it relates to an optimized rear casing for a spray gun, wherein the spray gun comprises a handle part and a gun barrel connected to the handle part. The disclosure thereby provides for the rear casing to be able to be detachably and replaceably attached to the rear side of a base body of the spray gun.

The rear casing has a first region designed as a handle casing which is constructed to cover in particular the rear side of the spray gun's handle body. The rear casing furthermore has a second region designed as a cover casing for the rear-side covering of a rear area of the gun barrel.

At least one connection element is provided on the second region of the rear casing via which a detachable connection can be made as needed to a component of at least partially complementary design thereto.

Particularly provided according to the disclosure is for the entire rear casing together with the at least one connection element to be formed as a monolithic plastic component, particularly a plastic injection molded part.

The advantages able to be achieved with the disclosure are obvious: by providing a rear casing formed as a monolithic plastic component, the rear area of the spray gun and in particular the area which connects the handle part of the spray gun to the gun barrel can be made particularly flexurally and torsionally rigid, which has a direct effect on facilitating the handling of the spray gun as a whole.

Moreover achieved by the integrally formed rear casing is being able to optimally seal the spray gun as a whole since the interface areas through which coating material can infiltrate are minimized.

A further decisive advantage can be seen in the first region designed as a handle casing being integrally and seamlessly; i.e. monolithically, connected to the second region designed as a cover casing. So doing ergonomically improves the handle part of the spray gun since there are no disruptive transitions which could potentially cause injuries to the hand of the spray gun operator.

According to embodiments of the present disclosure, the rear casing can further comprise a transition region which connects the first region designed as a handle casing to the second region designed as a cover casing. In this embodiment, the transition region together with the first region designed as a handle casing and the second region designed as a cover casing is formed as a whole as a monolithic plastic component.

According to preferential implementations of the disclosed rear casing, it is provided for the first region designed as a handle casing to be of approximate U or V shape in cross section at least in some areas and comprise a rear wall and two side walls integrally formed thereon. It is advantageous here for at least some outer surface areas of the rear wall and the side walls formed thereon of the first region designed as a handle casing to exhibit a configuration, and in particular structure, which is adapted to increase a secure grip.

According to preferential implementations of the disclosed rear casing, the outer surfaces of the rear wall and the side walls formed thereon of the first region designed as a handle casing exhibit a multi-edged curved shape which is in particular adapted to the hand of the spray gun operator.

This embodiment is based on the knowledge that when gripping the handle part of the spray gun, the operator necessarily needs to bend or at least partially bend the fingers of the gripping hand. Therefore, ergonomically speaking, an ergonomic multi-edged curved shape is an optimal shape for the handle part, or the first region designed as a handle casing respectively, in order to establish perfect grip.

Obviously, however, the disclosure is not limited to such specific embodiments of the first region designed as a handle casing.

According to embodiments of the disclosed rear casing, at least one cable strain relief is preferably integrated into the rear wall of the first region designed as a handle casing. Because the cable strain relief is integrated into the rear casing and specifically into the rear wall of the first region designed as a handle casing in this embodiment, the spray gun can be made particularly compact.

With respect to the second region of the rear casing designed as a cover casing, embodiments of the present disclosure provide for said region to be of approximate U shape in cross section at least in some areas and have a rear wall and two side walls integrally formed thereon. According to embodiments of the disclosed rear casing, the second region designed as a cover casing further comprises an upper wall with at least sections or parts thereof disposed opposite the first region designed as a handle casing. This upper wall is integrally formed on the rear wall and the side walls formed thereon of the second region designed as a cover casing.

It is advantageous here for the at least one connection element to be integrally formed on said upper wall. A hook-shaped or loop-shaped element is particularly suitable as the connection element.

According to advantageous further developments of the disclosed rear casing, at least one, in particular recessed, opening for at least one control element and/or at least one display element of the spray gun is provided in the rear wall of the second region designed as a cover casing. The at least one opening is in particular designed to receive and/or embed the at least one control element and/or the at least one display element of the spray gun in a recessed manner so as to ensure optimal protection of the control/display element while at the same time effectively preventing the infiltration of coating material around the edges of the opening.

Alternatively or additionally thereto, it is conceivable for at least one seating for a switch or the like and preferably an integrally formed element for operating a switch or the like which is movable relative to the rear casing to be formed, in particular integrally formed, in the rear casing and preferably in a side wall of the second region designed as a cover casing.

These developments thus enable integrating various functions into the monolithic rear casing.

Thus, provided for example in preferential embodiments is for at least one galvanically conductive grounding element to be integrated into the rear casing and preferably into the material of a side wall of the second region designed as a cover casing. The at least one grounding element serves to ground a counter-electrode of the spray gun or to set it to a ground potential respectively. To that end, in the assembled state of the spray gun, a grounding conductor, such as for example a galvanically conductive connecting bar, can connect the grounding element integrated into the rear casing to a counter-electrode arranged in proximity to a charge electrode of the spray gun in order to connect the counter-electrode to a different electric potential than the electric potential to which the charge electrode is connected. By so doing, at least some of the free ions generated during the electrical charging of the coating powder can be absorbed by the counter-electrode and the grounding element integrated into the rear casing.

The grounding element integrated in the rear casing is thereby preferably connected to ground or a potential connection in electrically conductive manner via an electrical line running in particular within the handle of the spray gun.

In order to facilitate assembly of the spray gun, it can be provided for a centering device, particularly in the form of a centering tab or the like, to be provided at least in some front longitudinal edge areas of the rear casing's side walls. The centering device is designed to effect particularly an independent aligning of the rear casing position relative to the rear side of the spray gun base body when the rear casing is mounted on the rear side of the base body.

Alternatively or additionally, it is advantageous for an at least partially graded area to be formed at least in some front longitudinal edge areas of the rear casing's side walls and in particular in or on the frontal area of the front longitudinal edge of the rear casing's side walls. Doing so can effectively achieve optimal sealing with respect to the rear side of the spray gun base body since the graded area enables the forming of a labyrinth sealing area.

The rear casing can be attached to the rear side of the spray gun base body, whereby according to preferential implementations, just a single screw is sufficient to correspondingly fix the rear casing to the base body of the spray gun. This further reduces the risk of coating material infiltrating into the spray gun since only a low number of openings need to be provided in order to accommodate a screw in the rear casing (in the best case scenario, just one).

Preferably, the entire rear casing is formed as a monolithic component made of an anti-static plastic material. Polyamide 12 is cited at this point as a preferential plastic material, whereby, however, other plastic materials would in principle also be suitable.

The disclosure further relates to a spray gun having such a rear casing.

The following will reference the accompanying drawings in describing an exemplary embodiment of the present disclosure in greater detail.

BRIEF DESCRIPTION OF THE DRAWINGS

Shown are.

DETAILED DESCRIPTION

Figure 1:
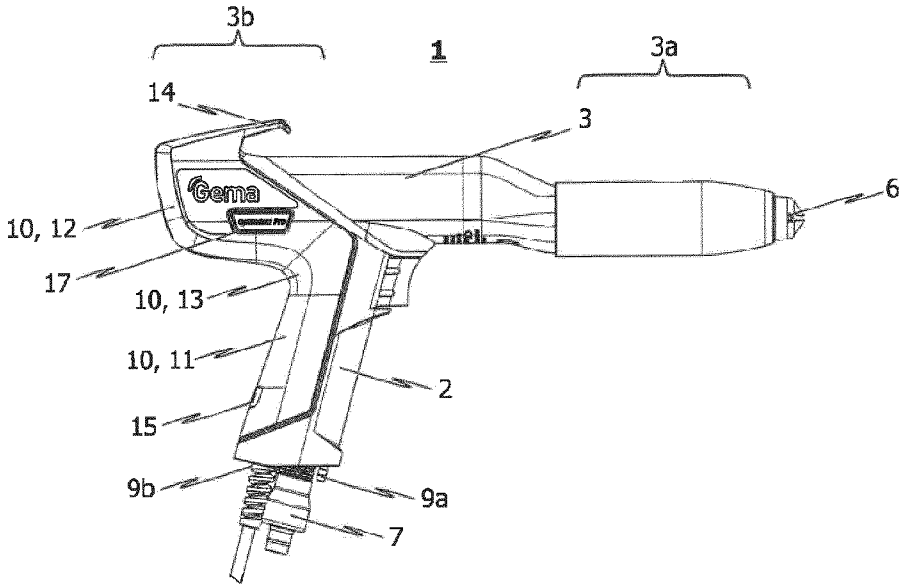
FIG. 1 a schematic and side view of an exemplary embodiment of the disclosed spray gun with the optimized rear casing in the assembled state.
Figure 2:
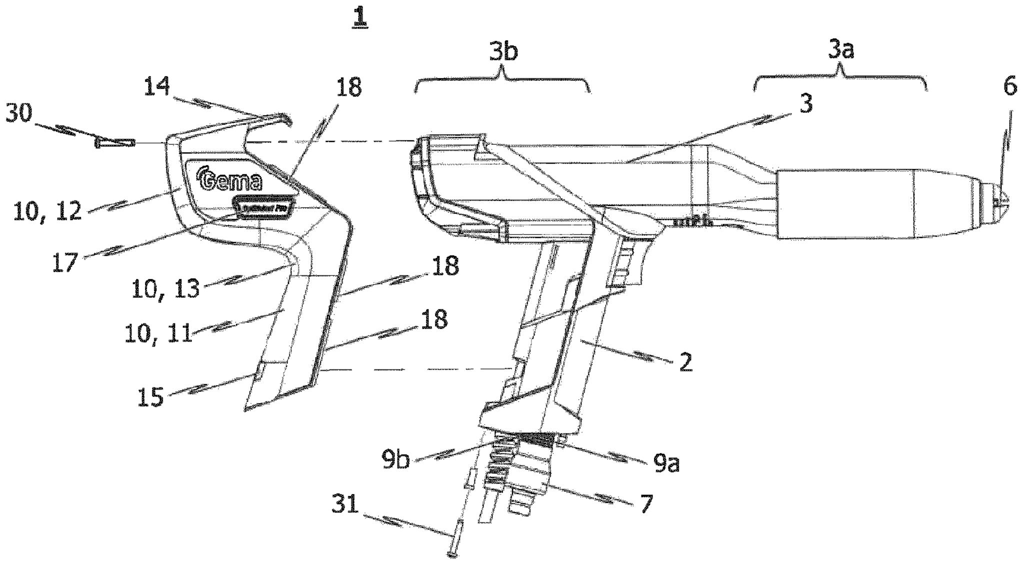
FIG. 2 a schematic and exploded view of the exemplary embodiment of the disclosed spray gun according to FIG. 1.

The disclosed spray gun 1, as shown schematically in the drawings by means of an exemplary embodiment, serves in particular in the applying of coating material onto an object (not shown in the drawings).

In the depicted embodiment of the disclosed spray gun 1, the particular coating material to be applied to the object is electrostatically charged or chargeable coating powder.

However, it is also provided for a spray gun 1 constructed according to the disclosure to be able to be used to apply other coating materials to an object instead of electrostatically charged coating powder. For example, the spray gun 1 can be used to apply liquid coating materials onto an object.

The spray gun 1, as schematically depicted in the drawings, essentially comprises a handle part 2 and a gun barrel 3 connected to the handle part 2.

The manually grippable handle part 2 exhibits, as can be seen particularly in the exploded views, a base body 4 connected to a base body 4 of the gun barrel 3. Preferably, the base body 4 of the handle part 2 is integrally formed with the base body 4 of the gun barrel 3, e.g. as a monolithic plastic injection molded part. This thereby creates in particular a one-piece base body 4 of the spray gun 1.

The gun barrel 3 of the spray gun 1 has a first (front) region 3*a* extending to a nozzle assembly 6 as well as a rear-side second (rear) region 3*b*. Thereby provided is for the handle part 2 to be arranged between the front and rear regions 3*a*, 3*b* and namely preferably in an area in which the handle part 2 is located across the center of mass of the gun barrel 3 as a whole. This supports the physical comfort of the operator of the spray gun 1 when using the spray gun 1, particularly over a relatively long period of time.

The base body 4 of the spray gun 1 is in particular formed in one piece from an electrically insulating (polymer) material.

Although not depicted in the drawings, an electrode arrangement can be accommodated or integrated in the gun barrel 3 of the spray gun 1 in order to electrostatically charge the coating material to be sprayed as needed. A corresponding voltage multiplier unit connected to the electrode arrangement can be accommodated in particular in the interior of the gun barrel 3 to that end. The voltage multiplier and the electrode arrangement work together in order to generate an electric field for electrostatically charging the coating material to be sprayed onto an object.

The coating material to be sprayed, in particular coating powder entrained in a flow of air, is fed to the spray gun 1 from a powder source not depicted in the drawings. The flow of coating powder entrained in the air is fed from a coating material supply line through an adapter 7 provided on the lower region of the handle part 2 into a coating material line running through the handle part 2.

Connections 9*a* for compressed air as well as connections 9*b* for electrical energy are further provided on the lower end region of the handle part 2.

The rear side of the main body of the spray gun 1 is covered by a rear casing 10 in the embodiment of the disclosed spray gun 1 shown in the drawings.

Thereby provided is for the rear casing 10 to be detachably and replaceably attached to the rear side of the base body of the spray gun 1, whereby the rear casing 10 is preferably fixed to the base body 4 of the spray gun 1 by a single screw 30 guided through the rear casing 10 in the attached state.

A further screw 31 can optionally be provided which applicably interacts with a screw seating provided in the interior of the rear casing 10 through the lower end region of the base body of the gun barrel 3.

The rear casing 10 essentially comprises a first region designed as a handle casing 11 as well as a second region designed as a cover casing 12, wherein the first region designed as a handle casing 11 serves in particular to cover the rear of the base body 4 of the gun barrel 3 of the spray gun 1. The second region of the rear casing 10 formed as a cover casing 12 serves to cover the rear-side rear area of the gun barrel 3.

A connection element 14 in the form of a hook-shaped area is further provided on the second region of the rear casing 10. By means of said connection element 14, the spray gun 1 can be detachably connected in its fully assembled state to, for example, a mounting.

Particularly provided according to the disclosure is for the entire rear casing 10 together with the at least one connection element 14 (hook-shaped area) to be formed as a monolithic plastic component, particularly a plastic injection molded part.

As indicated in the drawings, the rear casing 10 can further comprise a transition region 13 which connects the first region designed as a handle casing 11 to the second region designed as a cover casing 12. This transition region 13 (as part of the overall rear casing 10) is likewise monolithically and integrally connected to the handle casing 11 and the cover casing 12.

The first region designed as a handle casing 11 is of approximate U or V shape in cross section at least in some areas and comprises a rear wall and two side walls integrally formed thereon. It is thereby particularly advantageous for the outer surface areas of the rear wall and the side walls formed thereon of the first region designed as a handle casing 11 to exhibit a configuration adapted to increasing a secure grip.

A multi-edged curved shape which is adapted, specifically ergonomically adapted, to the hand of the operator of the spray gun 1 is in particular provided in the exemplary embodiment shown in the drawings for increasing secure grip.

Figure 3:
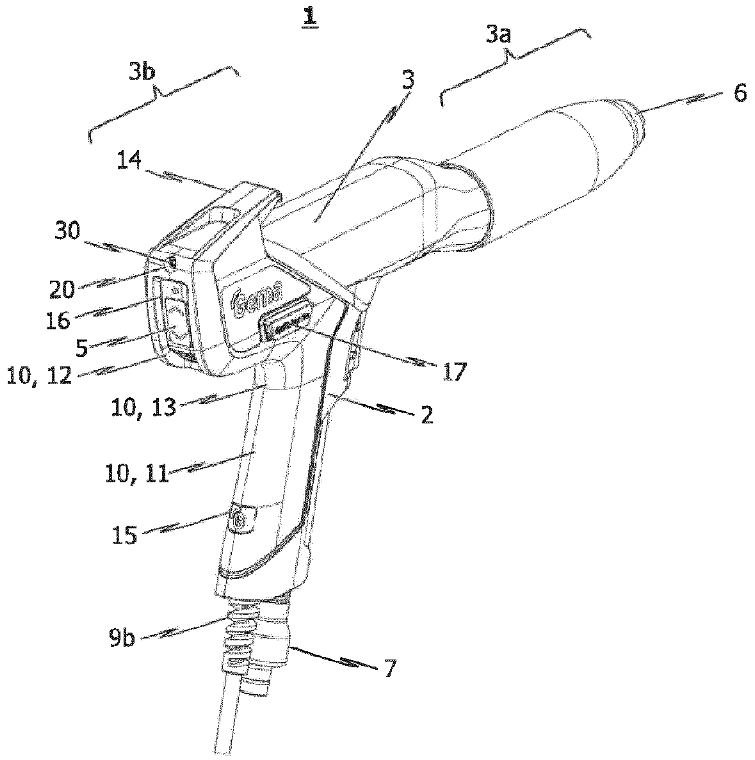
FIG. 3 a schematic and first isometric view of the exemplary embodiment of the disclosed spray gun according to FIG. 1.
Figure 4:
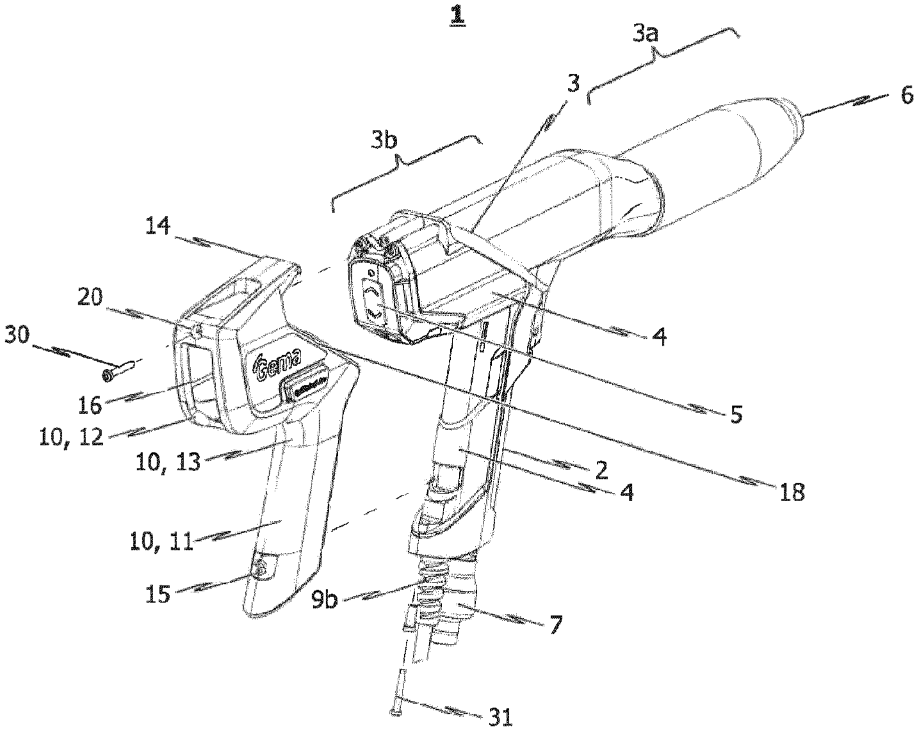
FIG. 4 a schematic and exploded isometric view of the exemplary embodiment of the disclosed spray gun according to FIG. 3.
Figure 5:
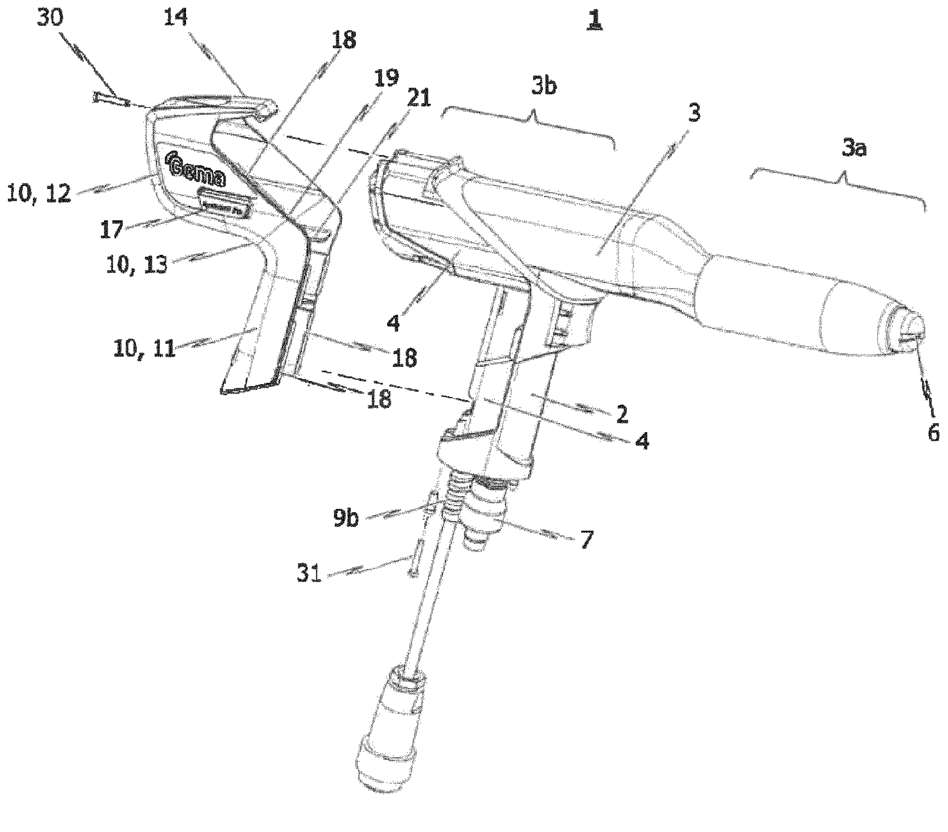
FIG. 5 a schematic and second exploded isometric view of the exemplary embodiment of the disclosed spray gun according to FIG. 1.

To be noted particularly from the FIG. 3 depiction is that a cable strain relief 15 is integrated into the rear wall of the first region of the rear casing 10 designed as a handle casing 11 in the embodiment depicted in the drawings.

With respect to the second region of the rear casing 10 designed as a cover casing 12, it is provided for said region to be of approximate U shape in cross section at least in some areas and have a rear wall and two side walls integrally formed thereon. Moreover, the second region designed as a cover casing 12 comprises an upper wall integrally formed on the rear wall and the side walls formed thereon of the second region designed as a cover casing 12 with at least sections or parts thereof disposed opposite the first region designed as a handle casing 11. Connection element 14 in the form of a hook-shaped element is integrally formed on said upper wall.

Able to be seen from the isometric view, for example according to FIG. 3, is that an in particular recessed opening 16 for a control element 5 of the spray gun 1 is formed in the rear wall of the second region designed as a cover casing 12 in the exemplary embodiment. This opening 16 is in particular designed for the receiving and embedding of the control element 5 of the spray gun 1 in a recessed manner.

Further able to be seen from the drawings is that at least one galvanically conductive grounding element 17 is integrated into the rear casing 10 and preferably into the material of a side wall of the second region designed as a cover casing 12. The at least one grounding element 17 serves to ground a counter-electrode of the spray gun or to set it to a ground potential respectively. To that end, in the assembled state of the spray gun 1, a grounding conductor, such as for example a galvanically conductive connecting bar, can connect the grounding element 17 integrated into the rear casing 10 to a counter-electrode arranged in proximity to a charge electrode of the spray gun in order to connect the counter-electrode to a different electric potential than the electric potential to which the charge electrode is connected. By so doing, at least some of the free ions generated during the electrical charging of the coating powder can be absorbed by the counter-electrode and the grounding element 17 integrated into the rear casing.

The grounding element 17 integrated in the rear casing is thereby preferably connected to ground or a potential connection in electrically conductive manner via an electrical line running in particular within the handle 2 of the spray gun 1.

A centering device 18 in the form of a centering tab is provided at least in some front longitudinal edge areas of the side walls of the rear casing 10 which enables particularly an independent aligning of the position of the rear casing 10 relative to the rear side of the base body of the spray gun 1 when the rear casing 10 is mounted on the rear side of the base body.

Additionally provided in the embodiment shown in the drawings is at least one guide element 21 formed in the interior of the rear casing 10 for facilitating insertion motion when mounting the rear casing 10 on the rear side of the base body of the spray gun 1.

The frontal areas 19 of the front longitudinal edge of the side walls of the rear casing 10 are preferably of graded configuration so as to be able to form a type of labyrinth seal with a corresponding area on the rear side of the base body of the spray gun 1.

The invention is not limited to the embodiment depicted schematically in the drawings as an example but rather yields from an integrated overall consideration of all the features disclosed herein.

The invention claimed is:

1. A powder spray gun comprising:

a handle having a base body;

a gun barrel having a base body;

a rear casing; and a nozzle assembly, wherein the base body of the handle is integrally formed with the base body of the gun barrel as a monolithic plastic injection molded part to form a base body of the powder spray gun;

wherein the rear casing of the powder spray gun is attached to a rear side of the base body of the powder spray gun, and wherein the rear casing of the powder spray gun comprises a first region designed as a handle casing and a second region designed as a cover casing for rear-side covering of a rear-most rearward facing surface of the gun barrel;

wherein the base body of the gun barrel has a front region extending to the nozzle assembly of the powder spray gun and a rear-side rear region opposite the front region of the base body of the gun barrel;

wherein the handle is arranged between the front region and rear region in an area in which the handle is located below a center of mass of the gun barrel as a whole;

wherein the powder spray gun further comprises an adapter that is provided on a lower region of the handle and that provides a connection between a coating material supply line and a coating material line running through the handle; and wherein the powder spray gun further comprises an electrode arrangement accommodated or integrated in the gun barrel of the powder spray gun in order to electrostatically charge coating material to be sprayed by the powder spray gun;

wherein the rear casing is formed as a monolithic component made of an anti-static plastic material;

wherein an at least partially graded area is provided at least in some front longitudinal edge areas of side walls of the rear casing, on frontal areas of the front longitudinal edge of the side walls of the rear casing, wherein the frontal areas are formed complementary to a corresponding area on the rear side of the base body of the powder spray gun; and wherein the graded area provided on the frontal areas of the front longitudinal edge of the side walls of the rear casing is configured to form a labyrinth seal with the corresponding area on the rear side of the base body of the powder spray gun.

2. The powder spray gun according to claim 1, wherein the rear casing comprises a transition region connecting the first region designed as a handle casing to the second region designed as a cover casing.

3. The powder spray gun according to claim 1, wherein the first region designed as a handle casing is curved or angled in cross section at least in some areas and comprises a rear wall and two side walls integrally formed thereon.

4. The powder spray gun according to claim 3, wherein outer surfaces of the rear wall and the side walls formed on the first region designed as a handle casing have a surface configuration adapted for increasing a secure grip formed as a multi-edged curved shape adapted to a human hand.

5. The powder spray gun according to claim 3, wherein at least one cable strain relief is integrated into the rear wall of the first region designed as a handle casing.

6. The powder spray gun according to claim 1, wherein the second region designed as a cover casing is curved in cross section at least in some areas and comprises a rear wall and two side walls integrally formed thereon.

7. The powder spray gun according to claim 6, wherein the second region designed as a cover casing further comprises an upper wall integrally formed on the rear wall and the side walls formed on the second region designed as a cover casing with at least sections or parts thereof disposed opposite the first region designed as a handle casing.

8. The powder spray gun according to claim 6, wherein at least one recessed opening for at least one control element of the powder spray gun is provided in the rear wall of the second region designed as a cover casing, wherein the at least one recessed opening is configured to receive and/or embed the at least one control element in a recessed manner.

9. The powder spray gun according to claim 6, wherein at least one galvanically conductive grounding element is integrated into the rear casing.

10. The powder spray gun according to claim 9, wherein the at least one galvanically conductive grounding element is integrated into material of one of the two side walls of the second region designed as a cover casing.

11. The powder spray gun according to claim 1, wherein one single opening is formed in the rear casing for accommodating a screw for detachably fixing the rear casing to the base body of the powder spray gun.

12. The powder spray gun according to claim 1, wherein a centering device, formed as a centering tab, is provided at least in some front longitudinal edge areas of side walls of the rear casing to effect an independent aligning of a position of the rear casing relative to the rear side of the base body of the powder spray gun when the rear casing is mounted on the rear side of the base body.

13. The powder spray gun according to claim 1, wherein at least one opening is formed in the rear casing for accommodating a screw for detachably fixing the rear casing to the base body of the powder spray gun.

14. The powder spray gun according to claim 1, wherein the anti-static plastic material comprises Polyamide 12.

* * * * *